United States Patent

Kober et al.

[11] Patent Number: 5,848,554
[45] Date of Patent: Dec. 15, 1998

[54] MULTISTAGE SPINDLE DRIVE FOR CONVERTING ROTARY MOTION INTO LINEAR MOTION

[75] Inventors: Kurt Kober, Kötz; Armin Rampp, Ursberg, both of Germany

[73] Assignee: Al-Ko Kober AG, Kötz, Germany

[21] Appl. No.: 696,969

[22] PCT Filed: Aug. 24, 1995

[86] PCT No.: PCT/EP95/03353

§ 371 Date: Oct. 8, 1996

§ 102(e) Date: Oct. 8, 1996

[87] PCT Pub. No.: WO96/05991

PCT Pub. Date: Feb. 29, 1996

[30] Foreign Application Priority Data

Aug. 25, 1994 [DE] Germany ............... 94 13 740 U

[51] Int. Cl.[6] .................. B60S 9/08; F16H 25/20
[52] U.S. Cl. .................. 74/424.8 B; 74/89.15; 192/34; 192/69.91; 254/102
[58] Field of Search ............... 254/102; 192/34, 192/69.91; 74/424.8 B, 89.15

[56] References Cited

U.S. PATENT DOCUMENTS

| | | | |
|---|---|---|---|
| 1,974,687 | 9/1934 | Morrison | 254/102 |
| 3,157,258 | 11/1964 | Cronholm | 192/34 |
| 3,986,409 | 10/1976 | Tripp et al. | 192/34 |
| 4,609,179 | 9/1986 | Chern et al. | 254/102 |
| 5,002,172 | 3/1991 | Stringer | 74/424.8 B |
| 5,201,084 | 4/1993 | Johnson | 254/102 |
| 5,337,627 | 8/1994 | Nakamura | 74/424.8 R |

FOREIGN PATENT DOCUMENTS 1328909  4/1902  France ............... 74/424.8 B

Primary Examiner—Richard M. Lorence
Assistant Examiner—David Fenstermacher
Attorney, Agent, or Firm—McGlew and Tuttle

[57] ABSTRACT

A multistep spindle drive is provided for converting a rotary movement into a linear movement with different speeds of withdrawal and extension. The spindle drive includes at least two threaded spindles, which telescopically mesh with each other and are in threaded connection with one another, and a nut. The inner threaded spindle is connected to a crank, and the nut is connected to a support wheel via a pipe. The internal threaded connection existing between the threaded spindles has a smaller diameter and a lower pitch than the external threaded connection existing between the outer threaded spindle and the nut. The speeds of withdrawal and extension are changed over based on the greater frictional force. A friction-increasing coupling member is arranged between the threaded spindles. The coupling member is spring-loaded and can be set for changing the friction.

19 Claims, 4 Drawing Sheets

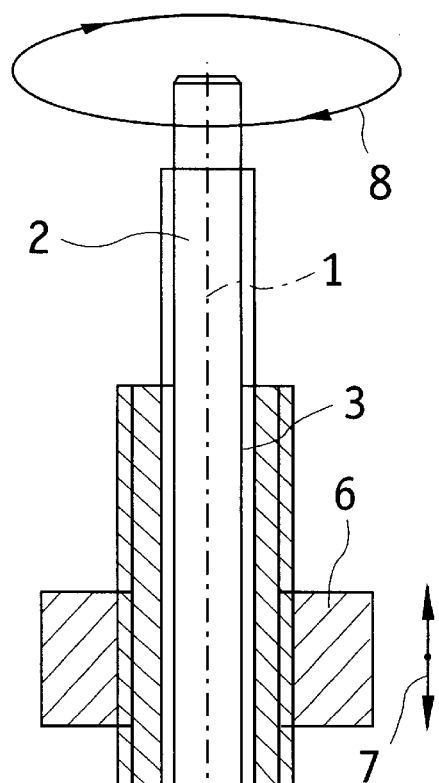
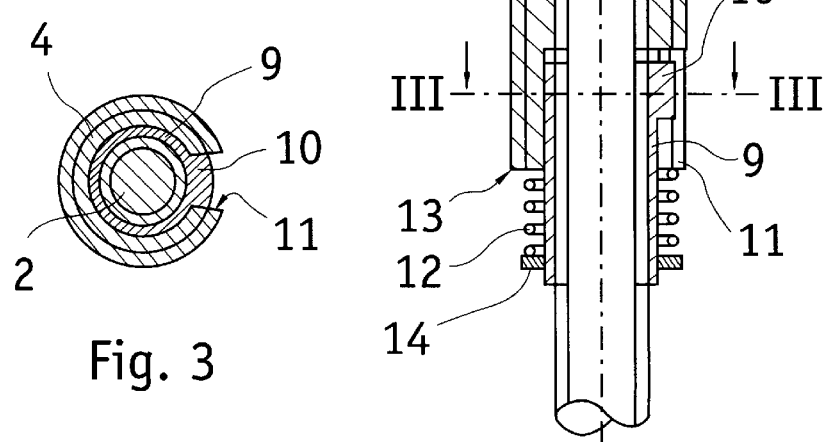
Fig. 2
Fig. 3

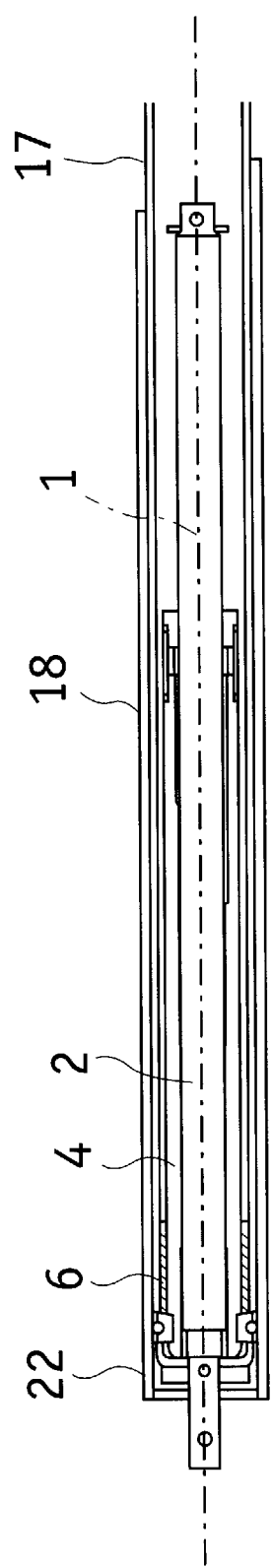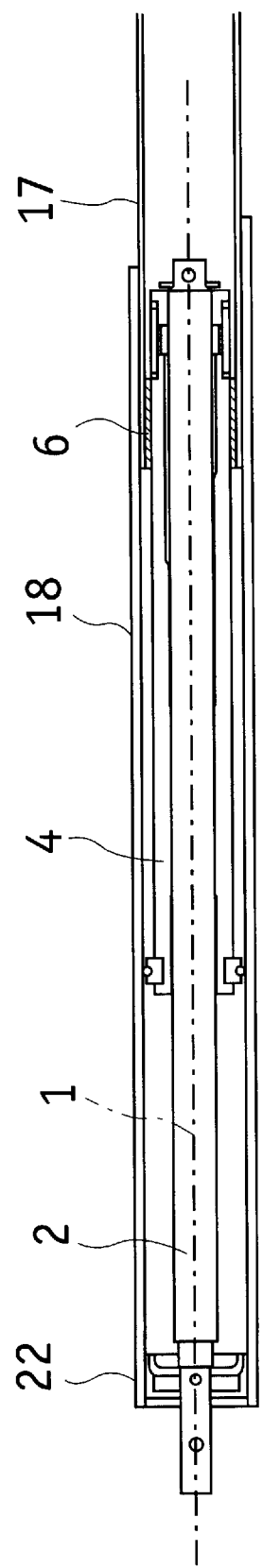

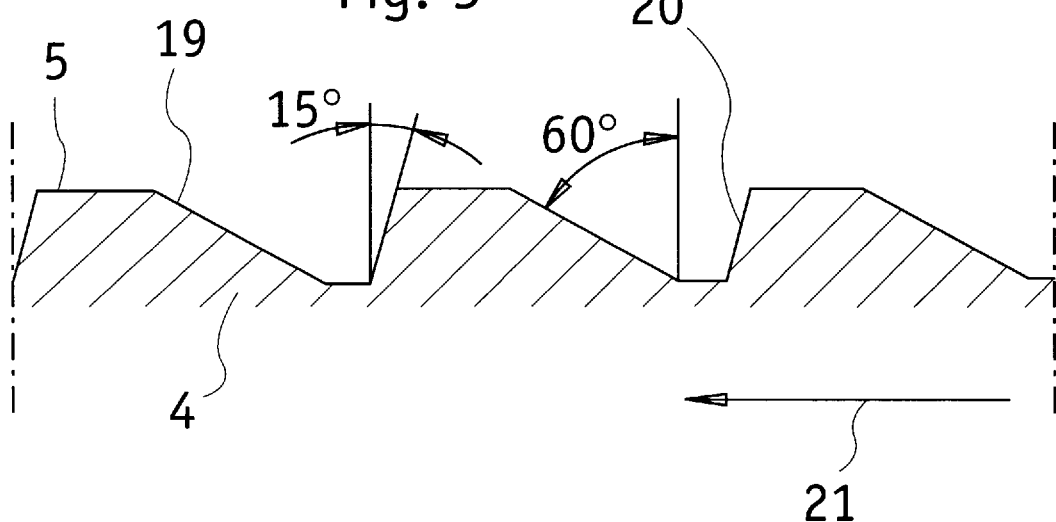
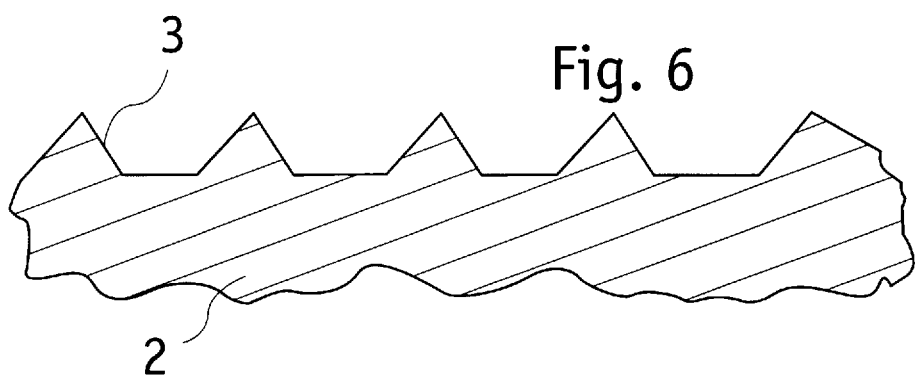

MULTISTAGE SPINDLE DRIVE FOR CONVERTING ROTARY MOTION INTO LINEAR MOTION

FIELD OF THE INVENTION

The present invention pertains to a multistep spindle drive for converting a rotary movement into a linear movement with different speeds of withdrawal and extension, including at least two threaded spindles with different pitches which telescopically mesh with one another and are in threaded connection with one another, wherein one spindle is connected to a drive element and another spindle is connected to an output element via a nut and wherein the threaded spindles and the speeds of withdrawal and extension can be changed over by frictional force.

BACKGROUND OF THE INVENTION

Such a spindle drive has been known from EP-A-0 552 129. The purpose of this arrangement is to perform the height adjustment of the support wheel more rapidly, when this wheel is not loaded, than in the loaded state. The spindle drive comprises two threaded spindles, which mesh with each other, are in a threaded connection with one another, and have different pitches and diameters. The smaller inner spindle with the lower pitch is rotated by means of a crank, and is screwed into the larger outer or hollow spindle. A nut, to which a support wheel is fastened via a pipe, is seated on the hollow spindle having the higher pitch. Due to the different pitches, the spindle drive has a fast motion and a load motion, which are changed over depending on the load by different frictional forces in the threads. During fast motion and load-free spindle drive, the inner spindle is said to carry the hollow spindle due to the higher friction and rotate it in relation to the nut. As soon as a supported load appears and the better transmitted, slower load motion is needed, the friction between the hollow spindle and the nut is said to become higher due to the load than the friction between the inner spindle and the hollow spindle, so that the inner spindle rotates in relation to the stationary hollow spindle during load motion. The differences in friction in the spindles which are needed for the fast motion are said to be achieved by the differences in pitch and diameter alone, which cannot always be achieved reliably and maintained for the long term in practice. It is also problematic that the thread between the hollow spindle and the nut is intentionally designed without self-locking. The consequence of this is, on the one hand, that the spindle drive may automatically withdraw under load in an undesired manner, and the position of the crank must therefore be compulsorily secured. However, the operator may forget about this. On the other hand, the spindle drive operates only when the supported load acts eccentrically from the spindle axis and it exerts an overturning movement reinforcing the frictional force on the hollow spindle/nut pair.

Another spindle drive with fast motion and load motion for actuating a support wheel for vehicle trailers has been known from DE-A 38 29 131. It likewise has an inner spindle and an outer spindle with different pitches and diameters, which are guided concentrically one inside the other, but are not screwed to one another. The housing of this support wheel comprises two parts, which are connected to one another via a thread and form the outer or hollow spindle. The lower part is flanged stationarily to the vehicle trailer. The upper part is adjustable in height by means of this thread and guides the inner spindle, which is connected to the support wheel via a nut and a pipe section. A pretensioned friction clutch, by means of which the upper part of the outer spindle can be carried during the rotation of the crank, is located on the crankshaft. The carrying takes place in fast motion, with both spindles rotating and their strokes adding up. During load motion, the moment of friction is greater in the parts of the outer spindle than in the friction clutch, so that only the inner spindle rotates.

SUMMARY AND OBJECTS OF THE INVENTION

The basic object of the present invention is to provide a multistep spindle drive, which makes possible easy handling and is able to function for a long time at low space and cost requirement.

According to the invention, a multistep spindle drive is provided for converting rotary movement into a linear movement having withdrawal and extension with different speeds of withdrawal and extension. A spindle drive includes at least two threaded spindles each with different pitches. The spindles telescopically mesh with one spindle being an inner spindle and the other spindle being an outer tubular spindle. One spindle is connected to a drive element and another spindle is connected to an output element via a nut. The speeds of withdrawal and extension can be changed over by frictional force. A friction increasing coupling member is arranged between the threaded spindles.

The coupling member arranged according to the present invention between the threaded spindles makes it possible to set the differences in friction necessary for the fast motion better and in a defined manner compared with how this is possible with the differences in pitch and diameter in the threaded spindles alone. The coupling member increases the friction between the threaded spindles to the extent that it is always greater with certainty in the unloaded state than between the threaded spindle and the output-side nut. Changes in friction, which occur during the operation and are due to wear, material, tolerances, dirt, and other effects, can be compensated with the coupling member. Moreover, the designer has a greater freedom of variation in selecting the pitches, diameters, and materials of the threaded spindles. The present invention ensures that the fast motion and the load motion function under all operating conditions and for the long term during the change in load.

Various possibilities are available for designing the coupling member. It is preferably spring-loaded and its action is adjustable. In addition, it may act as a nut stop if designed as a threaded bush arranged at the end.

To better secure the spindle drive against unintended withdrawal under load, the present invention provides for a suitable means in the area of the output-side threaded spindle and of the external threaded connection. The lack of self-locking of the external threaded connection is compensated as a result in a simple and reliably operating manner, and automatically. The operator no longer has to think of the support securing and he no longer needs to actuate any extra securing means on the crank.

Various possibilities are available for securing the spindle drive. The preferred embodiment with the friction-increasing flank profile offers the advantage that it can act in a specific manner. With a flank flattening on one side, increased thread friction and quasi a self-locking is generated in the external threaded connection against the supported load, and this self-locking acts in the case of load only and does not hinder the extension and withdrawal of the spindle drive in the fast motion. On the other hand, the change of speed and the changeover of the spindle are improved. The spindle drive according to the present invention operates reliably in the case of supporting forces acting near the axis as well.

The spindle drive according to the present invention may have two or more steps. It may be used for any purpose. A preferred field of application is adjustable supports for vehicles or vehicle trailers.

Additional advantageous embodiments of the present invention are described in the subclaims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is an enlarged and cutaway representation of the spindle drive according to FIG. 1;

FIG. 3 is a cross sectional view through the spindle drive along line III—III in FIG. 2;

FIG. 4a is a cross sectional view showing the spindle drive in the withdrawn positions;

FIG. 4b is a cross sectional view showing the spindle drive in the extended position;

FIG. 5 is a cutaway longitudinal sectional view through the flank profile of the outer threaded spindle;

FIG. 6 is a cutaway longitudinal sectional view through the flank profile of the internal thread connection.

DESCRIPTION OF THE PREFERRED EMBODIMENT

Figure 1:
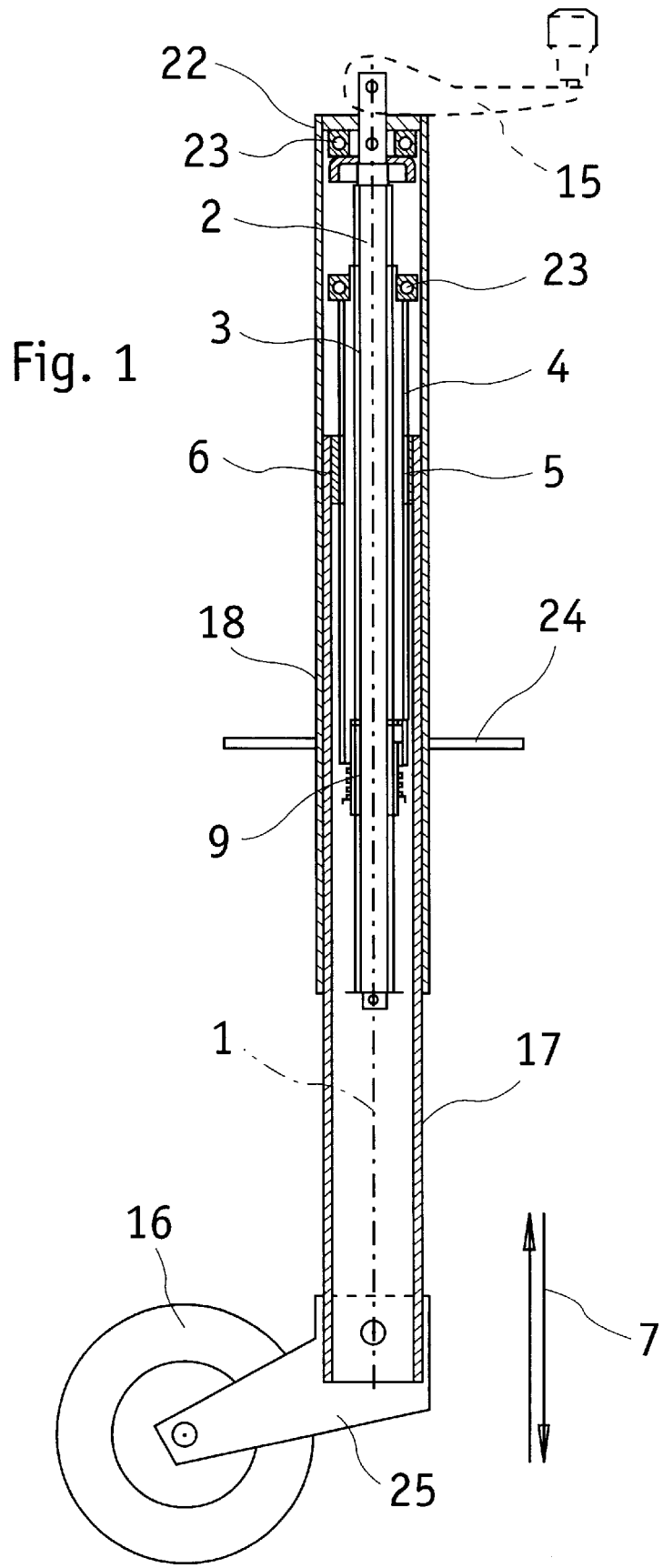
FIG. 1 is a longitudinal sectional view through a spindle drive in the form of a vehicle support.

FIG. 1 shows a longitudinal section through a spindle drive 22, which is designed here as a height-adjustable support device for a vehicle or a vehicle trailer. The spindle drive 22 may be used for any other purpose as well.

The spindle drive 22 is a two-step spindle drive in the embodiment shown. It comprises two threaded spindles 2, 4 meshing with each other, and a nut 6. The inner, drive-side threaded spindle 2 is provided at its top end with a suitable drive element 15, preferably in the form of a crank here. The nut 6 rotating on the outer threaded spindle 4 is connected to a pipe, which carries at the lower end an output element 16, which is preferably designed as a rotatable support wheel here and is connected to the pipe 17 via an extension arm 25.

The spindle drive 22 is inserted into a housing, which is formed by, e.g., a cylindrical pipe 18. Flange plates or the like, acting as fitting parts 24 for fastening the spindle drive 22 to a vehicle or a vehicle trailer, are arranged on the pipe 18. The shaft of the inner threaded spindle 2 with the crank 15 projects from the top end of the pipe 18. The spindle shaft is fastened via a suitable pivot bearing 23 with a pot-shaped support disk arranged under it to the cover of the pipe 18 and is held and guided centrally inside the pipe.

The pipe 17 connected to the nut 6 is telescopically guided in the outer pipe 18 and it preferably also has a cylindrical shape. As an alternative, the two pipes 17, 18 may also be secured against rotation in relation to one another, which is possible by, e.g., an oval or polygonal shape.

As is specifically shown in FIGS. 2 and 3, the inner threaded spindle 2 and the outer, hollow threaded spindle 4 are connected to one another along a common axis 1 via a so-called internal threaded connection 3. The inner threaded spindle 2 has external threads, which preferably extend almost over the entire length of the spindle. The outer threaded spindle 4 has corresponding internal threads, which preferably extend over only part of the length of the spindle.

The hollow threaded spindle 4 has an external threaded connection 5, on which the nut 6 is linearly movable corresponding to the arrow 7 during the rotation of the outer threaded spindle 5. A rotary movement according to arrow 8 is introduced onto the inner threaded spindle 2 via, e.g., the crank 15, and this rotary movement is converted into a linear movement 7 of the nut 6.

The nut 6 is secured against rotation, which can be ensured, e.g., by the nonrotatable guiding of the inner pipe 17 connected to the nut 6 in the outer pipe 18. As an alternative, the securing against rotation may also be achieved by increased friction of the pipe walls or by fixing the support wheel 16.

In addition, a coupling member 9, which increases the friction on the internal threaded connection 3, is arranged between the threaded spindles 2, 4. In the preferred embodiment, the coupling member 9 is designed as a threaded bush 9, which is in threaded engagement with the external threads 3 of the inner threaded spindle 2 and is guided longitudinally movably and nonrotatably in an enlarged, thread-free opening at the lower end of the outer threaded spindle 4. For securing against rotation, the threaded bush 9 engages, with an outwardly projecting carrier 10, a slot-like recess 11 on the outer threaded spindle 4. A compression spring 12, which is tensioned between the front end 13 of the outer threaded spindle 4 and a stop 14 located on the threaded bush 9, is located on the circumference of the threaded bush 9 extending beyond the front end 13 of the outer threaded spindle 4.

Together with the inner threaded spindle 2, which is in threaded engagement, the threaded bush 9 is pushed by the compression spring 12 away from the outer threaded spindle 4. This leads to tensioning on the internal threaded connection 3 and to the absorption of the backlash existing between the two threaded spindles 2, 4. The frictional force occurring between the thread flanks of the inner threaded spindle 2 and the threaded bush 9 as well as the outer threaded spindle 4 is increased. The inner threaded spindle 2 and the nut 6 consist of metal, preferably steel. In contrast, the outer threaded spindle 4 consists of a low-friction, tough plastic, e.g., POM.

The telescopic longitudinal movement of the outer threaded spindle 4 in relation to the inner threaded spindle 2 is limited upward by the pot-shaped disk on the spindle shaft and a pivot and thrust bearing 23 located on the head of the outer threaded spindle 4. The inner threaded spindle 2 is thus still able to rotate even when in contact. The longitudinal movement is limited downward by a stop at the end of the inner threaded spindle 2. The longitudinal movement of the nut 6 on the outer threaded spindle 4 is limited by the above-mentioned bearing 23 in the upward direction and by the coupling member 9 or another stop in the downward direction. FIG. 4 shows the spindle drive 22 in the withdrawn and extended positions.

The internal and external threaded connections 3, 5 are designed as movement threads. They are, e.g., trapezoidal threads, which are double-threaded and have a reduced profile depth. The trapezoidal threads may have increased backlash.

The internal threaded connection 3 has a lower pitch than the external threaded connection 5. In addition, the diameter of the internal threaded connection 3 or of the inner threaded spindle 2 is smaller than the diameter of the external threaded connection 5 or of the outer threaded spindle 4. The pitch angle of the external threaded connection 4 is greater than the so-called angle of friction, so that the external threaded connection 4 has no self-locking in the case of normal flank geometry of the trapezoidal threads. The external threaded connection has a size of Tr 30×16 P8 and the internal threaded connection 3 has a size of Tr 16×4 in the exemplary embodiment shown.

Due to the differences in pitch, the spindle drive 22 has a fast motion and a slow motion. The speeds are changed over depending on the friction and load. The external threaded connection moves with the higher pitch in fast motion, as a result of which the nut 6 with the inner pipe 17 and with the output element 16 moves up and down at increased speed, depending on the direction of rotation. The internal threaded connection 3, which has a shorter stroke due to the lower pitch, but a better power ratio, rotates in slow motion. The output element 16 is moved rapidly up and down with the fast motion in the nonloaded state. The slow motion is switched on when a supported load occurs, and it permits an ergonomic actuation of the spindle drive 22. The driving force to be applied or the force of the hand is preferably essentially the same for both speeds.

The speeds are changed over depending on the friction and load. Due to the differences in pitch and diameter as well as the force applied by the coupling member 9, the friction is greater in the internal threaded connection 3 than in the external threaded connection 5 of the threaded spindle 4 in the nonloaded state of the spindle drive 22. As a result, the inner threaded spindle 2 carries the outer threaded spindle 4 during its rotation and rotates it in relation to the nut 6. The nut 6 consequently moves linearly as shown at direction arrows 7 up and down in fast motion with the inner pipe 17 and the output element 16.

As soon as a supported load acting in the direction of the spindle appears, e.g., because the output element 16 reaches the ground, this increases the friction in the external threaded connection 5. A certain overturning moment may also appear additionally because of the backlash. This moment is generated by the extension arm 25 and the eccentric action of the supported load in relation to the spindle axis 1. The friction resistance in the external threaded connection 5 now becomes greater than the friction resistance in the internal threaded connection 3. The consequence of this is that the external threaded connection 5 stops and the internal threaded connection 3 sets into motion, and the inner threaded spindle 2 rotates in the outer threaded spindle 4. This is the so-called slow motion, during which the nut 6 performs only a slow linear movement 7, while the torque to be applied to the inner threaded spindle 2 is relatively low because of the smaller diameter.

The spindle drive 22 has a means for inhibiting the withdrawing movement under load, which is arranged in the area of the external threaded connection 5. As is shown in FIG. 5, the external threaded connection 5 has a flattened flank angle on the thread flanks 19 that are the active flanks under the supported load and the axial force 21. FIG. 5 shows this on the external threads of the outer threaded spindle 4, in which the said thread flank 19 points downwardly toward the output element 16.

Increased frictional force, which leads to a kind of self-locking of the external threaded connection 5 under load, is generated by the flattening of the flank. The moment of friction or braking moment generated by the increased frictional force counteracts the driving torque applied by the supported load or the axial force 21 and prevents the automatic withdrawal of the spindle drive 22 under load.

On the other hand, another consequence of this design is that the friction in the external threaded connection 5 very rapidly becomes higher under load than in the internal threaded connection 3, and the changeover from fast motion to slow motion takes place. Contrary to the state of the art, no overturning moment is needed for this in the external threaded connection 5. The increase in the frictional force and the change in speed also take place under axial forces 21 which act close to or in the spindle axis 1.

The flank angle to be selected for the quasi-self-locking depends on the design of the thread, the coefficient of friction, etc. In the practical embodiment, the flank angle between the thread flank 19 and the horizontal extending at right angles to the axis 21 has a value of at least 40° and preferably 60°.

The flank profile of the external threaded connection 5 is preferably asymmetric, so that the flattening of the angle and the increase in friction are present only on thread flanks 19 that are in contact with one another under load. The flank angle on the rear thread flanks 20 may be steeper, corresponding to the shape of thread selected, and it equals, e.g., about 15° against the horizontal. As a result, there is no increased friction resistance in fast motion during the load-free rotation up and down of the output element 16. The thread can be designed for this in the ergonomically favorable form.

Various modifications of the exemplary embodiments shown are possible. On the one hand, the threaded connections 3, 5 may have different thread shapes. Furthermore, the spindle drive 22 may have more than two meshing threaded spindles 2, 4. Instead of the crank 15, it is possible to use another drive element, e.g., even a motor or the like. Instead of the support wheel 16, the drive element may also have a support foot or the like. This is advantageous, e.g., for supports of semitrailers.

The materials and friction pairings may be modified as well. They can be varied in wide limits due to the coupling member 9, but the differences in friction in the internal and external threaded connections 3, 5 which are necessary for the fast motion and for the changing of speeds are nevertheless preserved. This also applies to the modifications of the differences in the pitches and diameters between the internal and external threaded connections 3, 5. There need not ultimately be any thread-related differences in friction in these threaded connections 3, 5, and these differences may be generated by the coupling member 9 alone. It is also possible to transpose the association of the spindles and the differences in pitch.

Another variation is possible concerning the means for inhibiting the unintended withdrawing movement under load. Increased friction or self-locking may also be brought about by a spring element or tensioning element, which acts, e.g., similarly to the coupling member 9. In addition, self-locking may be generated in the external threaded connection 5 by means of changed friction pairings in the normal manner.

We claim:

1. A multistep spindle drive for converting a rotary movement into a linear withdrawal and extension movement with different speeds of withdrawal and extension, the drive comprising:
 a threaded spindle, with a threaded region having a threaded spindle thread pitch;

another threaded spindle with a spindle engaging threaded region and with another threaded region having another threaded spindle thread pitch, said another threaded spindle thread pitch being different from said threaded spindle thread pitch, said another threaded spindle being telescopically connected with said threaded spindle to form a threaded connection with said spindle engaging threaded region engaging said threaded spindle threaded region;

a drive element, said threaded spindle being connected to said drive element;

a nut engaged with said another threaded region of said another threaded spindle;

an output element connected to said another threaded spindle via said nut; and a friction-increasing coupling member connected to said threaded spindle and connected to said another threaded spindle for applying force between said threaded spindle and said another threaded spindle for increasing a frictional force at said threaded connection wherein one of said threaded spindle and said another threaded spindle is an outer threaded spindle and another of said threaded spindle and said another threaded spindle is an inner threaded spindle.

2. A spindle drive in accordance with claim 1, wherein said threaded spindle is an outer threaded spindle and said another threaded spindle with another threaded spindle thread pitch cooperates with a thread of said nut to provide an external threaded connection located between said another threaded spindle and said nut, said another threaded spindle being an inner threaded spindle with said threaded connection being provided as an internal threaded connection, said inner threaded spindle being guided on said outer threaded spindle said internal threaded connection having a pitch that is smaller than the pitch of the said external threaded connection.

3. A spindle drive in accordance with claim 2, wherein: said outer threaded spindle has said external threaded connection on the order of magnitude of Tr 30×16 P8 and a said internal threaded connection on the order of magnitude of Tr 16×4.

4. A spindle drive in accordance with claim 2, further comprising: inhibiting means for inhibiting the withdrawing movement under load, said inhibiting means being provided as part of said external threaded connection.

5. A spindle drive in accordance with claim 4, wherein: said external threaded connection has a friction-increasing flank profile in the direction of the application of the load.

6. A spindle drive in accordance with claim 5, wherein: said flank profile has a thread flank with an angle of at least 40°.

7. A spindle drive in accordance with claim 6, wherein: said flank profile has a thread flank with an angle of approximately 60°.

8. A spindle drive in accordance with claim 5, wherein: said external threaded connection has thread flanks of different flank angles including a thread flank that is in a non-driving state under supported load which is steeper than said friction-increasing flank profile.

9. A spindle drive in accordance with claim 1, wherein: said coupling member includes a spring-loaded threaded bush on said inner threaded spindle.

10. A spindle drive in accordance with claim 9, wherein said threaded bush includes a carrier, said outer threaded spindle having a fitting radial recess, said threaded bush engaging said fitting radial recess.

11. A spindle drive in accordance with claim 10, wherein:

said carrier is a radially outwardly projecting carrier; and said tubular outer threaded spindle has a slot, defining said fitting radial recess, which extends axially in parallel and is engaged by said radially outwardly projecting carrier.

12. A spindle drive in accordance with claim 1, wherein: said friction-increasing coupling member includes an axially acting compression spring, said threaded bush having a stop, said axially acting compression spring being tensioned between said front end of said outer threaded spindle and said stop of said threaded bush, guided on a circumferential surface of said threaded bush.

13. A spindle drive in accordance with claim 12, wherein: said threaded bush includes a radially outwardly projecting carrier; and said tubular outer threaded spindle includes a wall with a said slot, slot extending axially in parallel to and engaging said radially outwardly projecting carrier of the said threaded bush.

14. A spindle drive in accordance with claim 1 wherein: said inner threaded spindle and said nut are formed of metal and the said outer threaded spindle is formed of a low-friction plastic.

15. A spindle drive in accordance with claim 14, wherein: said metal is a steel or steel alloy.

16. A spindle drive in accordance with claim 1, wherein: said drive element includes a crank, and the said output element includes a support foot or support wheel.

17. A spindle drive in accordance with claim 1, wherein: said spindle drive is as an adjustable support.

18. A spindle drive in accordance with claim 17, wherein: said support is a support wheel.

19. A multistep spindle drive for converting a rotary movement into a linear withdrawal and extension movement with different speeds of withdrawal and extension, the drive comprising:

an outer threaded spindle, with an outer threaded region having a outer threaded spindle thread pitch;

an inner threaded spindle with an inner threaded region and with another threaded region having another thread pitch, said another thread pitch being different from said outer threaded spindle thread pitch, said inner threaded spindle being telescopically connected with said outer threaded spindle to form a threaded connection with said inner threaded region engaging said outer threaded region;

a drive element, said inner threaded spindle being connected to said drive element;

a nut engaged with said another threaded region of said another threaded spindle at a nut threaded connection;

a friction-increasing coupling member connected to said outer threaded spindle and connected to said inner threaded spindle for applying force between said outer threaded spindle and said inner threaded spindle for increasing a frictional force at said threaded connection; and an output element connected to said outer threaded spindle via said nut, said output element having a load state and a no load state wherein in said load state a frictional force at said nut threaded connection is greater than a frictional force at said threaded connection for changing the speeds of withdrawal and extension.

* * * * *